Patented Oct. 14, 1924.

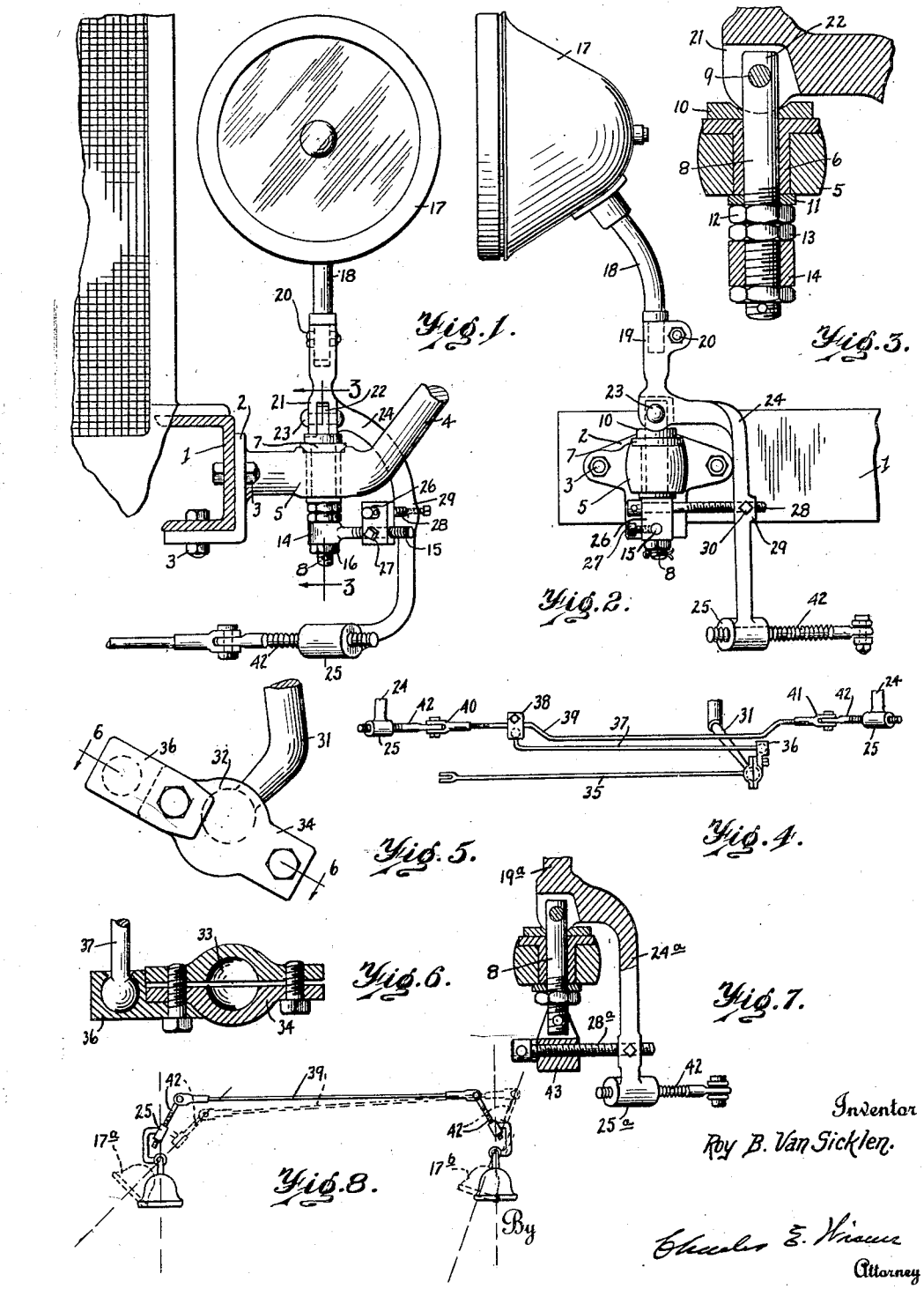

1,511,247

UNITED STATES PATENT OFFICE.

ROY B. VAN SICKLEN, OF DETROIT, MICHIGAN.

DIRIGIBLE HEADLIGHT.

Application filed August 24, 1922. Serial No. 583,950.

*To all whom it may concern:*

Be it known that I, ROY B. VAN SICKLEN, a citizen of the United States, residing at Detroit, county of Wayne, State of Michigan, have invented a certain new and useful Improvement in Dirigible Headlights, and declare the following to be a full, clear, and exact description of the same, such as will enable others skilled in the art to which it pertains to make and use the same, reference being had to the accompanying drawings, which form a part of this specification.

This invention relates to dirigible headlights and the object of the invention is to provide a pair of headlights arranged to turn with the steering wheels of a vehicle the headlights being also adjustable in a vertical plane for directing the ray of lights onto the road. Another object of the invention is to provide a pair of dirigible headlights in which the beams of light are thrown in parallel relation when directed straight ahead of the vehicle, the beams of light separating when the front wheels of the vehicle are turned and illuminating a larger area. Another object of the invention is to provide a mechanism for turning the headlights with the steering wheels of the vehicle, the headlight on the inner side of the vehicle being turned further than the headlight on the outer side of the vehicle so that the side of the road during turning of the vehicle is illuminated and the rays of light are spread over a greater area. Another object of the invention is to provide a support for the lamp whereby the lamp may be tilted in a vertical plane and adjusted at any angle and at the same time is rotatable in a horizontal plane on its axis upon movement of the steering wheels in either direction. By the use of this device the road may be lighted directly in front of the vehicle at all times, the rays being thrown ahead of the steering wheels so that all obstructions can be seen before they are encountered and in turning corners the side of the road as well as that directly in front of the vehicle is illuminated. These objects and the several novel features of the invention are hereinafter more fully described and claimed and the preferred form of construction by which these objects are attained is shown in the accompanying drawings in which—

Fig. 1 is a front elevation of one of the headlights and operating mechanism therefor.

Fig. 2 is a side elevation thereof.

Fig. 3 is an enlarged section taken on line 3—3 of Fig. 1.

Fig. 4 is a front elevation showing the connection of the headlight operating mechanism with the automobile steering mechanism.

Fig. 5 is a detail of the connection to the steering arm.

Fig. 6 is a section taken on line 6—6 of Fig. 5.

Fig. 7 is a section through an alternative form of construction.

Fig. 8 is a plan view showing the operation of the device.

As shown in Figs. 1 and 2 the automobile chassis 1 is provided with a bracket 2 secured thereto by the bolts 3 and this bracket is provided with an extending portion 4 for supporting the automobile fender. The bracket 2 is provided with an enlarged portion 5 at the side of the frame 1 which is apertured to receive a bronze bushing 6 shown particularly in Fig. 3. The head of the bushing is of peculiar shape as shown in Fig. 1 and sets in a notch 7 provided in the upper face of the enlargement 5, this arrangement preventing rotation of the bushing in the portion 5. As shown in Fig. 3 a short rod or bolt 8 extends through the bushing 6 and is provided with an aperture 9 at the upper end, a washer 10 being positioned about the rod 8 above the bushing 6. A washer 11 is slipped over the bolt 8 at the lower end and a nut 12 is threaded onto the bolt so that the washer 11 is engaged between the nut 12 and the bushings 6, a lock nut 13 being threaded onto the bolt to lock the nut 12 in position. As shown in Figs. 1 and 3 a member 14 is slipped over the lower end of the bolt 8 and is provided with a threaded shaft 15 extending from the side thereof and the member 14 is held in position by a nut 16 threaded onto the lower end of the bolt 8, the lower end of the bolt being apertured to receive a cotter pin to prevent removal of the parts therefrom. The headlight 17 is supported on a rod 18 which is inserted in the upper end of the member 19 and clamped in place by a bolt 20. The member 19 as shown in Figs. 1 and 3 is provided with a bifurcated end 21 which fits over the flattened upper end 22 of the bolt 8. A pin 23 is inserted through apertures provided therefor in the bifurcated portion 21 and through the aperture 9 of the bolt 8 providing a pivot for the member 19 whereby the headlight may swing in a vertical plane. The member 19 is provided with a portion 24 formed integrally therewith and extending from the bifurcated portion 21, the portion 24 being bent and curved downwardly and provided with an enlarged end 25 extending at an angle to the axis of the headlight as shown in Fig. 8. A block 26 is threaded onto the shaft 15 and is provided with a set screw 27 for securing the block to the shaft 15. A threaded screw 28 extends through the block 26 and is threaded through the enlarged portion 29 of the portion 24 of the member 19 a set screw being provided for locking the shaft 28 from rotation. By this construction the member 24 is connected to the lower end of the rod 8 and by means of bifurcated portion 21 and pin 23 the member 24 is connected to the upper end of the bolt 8. As shown in Figs. 4 and 5 the steering arm 31 of the automobile is provided with a ball end 32 fitting in a socket 33 provided therefor in a member 34. This member 34 as shown in Fig. 4 is connected by means of a rod 35 to the rod for operating the forward steering of the automobile wheels as will be readily understood. A ball socket 36 is secured to the member 34 and a rod 37 is provided having a ball end fitting in the socket 36. The opposite end of the rod 37 is provided with a ball end fitting in a bracket 38 which is secured to a rod 39. The rod is provided with bifurcated ends 40 and 41 in each of which an eye bolt 42 is pivotally secured. Each shaft 42 is threaded through the portion 25 of the members 19 as shown in Figs. 1 and 2.

In operation when the arm 31 is moved to the right of Fig. 4 the steering wheels are turned by means of the rod 35 and other connections not here shown. This movement of the arm 31 is communicated through the rod 37 to the rod 39, moving the said rod 39 from the position shown in full lines in Fig. 8 to that shown in dotted lines. This movement of the rod 39 moves the shafts 42 as shown which turns the members 19 and portions 24 and bolts 8 and assembled parts in the bushing 6 thus turning the headlights in the direction of the steering wheels. On account of the shafts 42 being pivoted to the rod 39 and extending at an angle therefrom the headlights 17$^a$ on the inside of the turn made by the vehicle is turned to a greater extent than the headlight $b$ thus illuminating the side of the road as well as the road on which the vehicle is about to travel, the headlight 17$^b$ illuminating the portion of the road not illuminated by the headlight 17$^a$. In devices where both headlights turn in parallel relation the further the lights are turned the closer the beams are centered on one spot and a particular object of this invention is to cause the beams of light to diverge to a slight extent when turning so as to illuminate a greater area. By threading the shafts 42 into or out of the portions 25 the lights may be adjusted in relation one to the other and by loosening the bolts 20 the headlights may be adjusted separately and a further adjustment is provided by threading the shaft 15 into or out of the block 26 and by threading the shaft 28 into or out of the enlarged portion 29 of the portion 24 to tilt the headlights in a vertical plane.

An alternative form of construction is shown in Fig. 7 in which the portion 24$^a$ of the member 19 is positioned directly behind the bolt 8. In this case a block 43 is pivotally secured to the lower end of the bolts 8 and the threaded shaft 28$^a$ is threaded through the block 43 and through an enlarged portion provided on the member 24$^a$, the member 24$^a$ being provided at the lower end with an enlarged portion 25$^a$ adapted to receive the threaded eye bolt 42. By rotating the shaft 28$^a$ the member 24$^a$ may be moved outwardly and inwardly thus tilting the support 19$^a$ for the headlight to throw the beams from the headlight onto the road and allow proper adjustment thereof. The operation of the shaft 28 shown in Figs. 1 and 2 is the same as the rotation of the said shaft moving the member 24 on the pivot 23 thus tilting the headlight in a vertical plane and allowing adjustment thereof. Both shafts 28 and 28$^a$ are each adapted to be held in position by a set screw so that it is impossible for the vibration of the car to change the adjustment of the headlights. As shown in Fig. 3 the bifurcated portion 21 of the member 19 is rounded to provide a ball shaped end which is adapted to seat in a rounded recess provided therefor in the washer 10 which allows the headlights to be easily tilted in a vertical plane accomplished by adjustment of the shafts 28 and 28$^a$.

From the foregoing description it becomes evident that the device is very simple and efficient in operation, will not easily get out of order, may be easily adjusted in a vertical or horizontal plane, will illuminate a greater area when turned out of parallel alignment and provides a device which accomplishes the objects described.

Having thus fully described my invention its utility and mode of operation what I claim and desire to secure by Letters Patent is—

1. In a dirigible headlight for automobiles having a steering arm for turning the forward wheels thereof, a bracket adapted to be secured to the chassis of the automobile, a bushing secured to the bracket, a bolt rotatably mounted in the bushing, a support pivotally mounted on the upper end of the bolt to swing in a vertical plane, a headlight secured to the upper end of the support, the said support having a depending end, a screw shaft secured to the lower end of and extending at a right angle to the axis of the bolt, a block threaded on the said screw shaft, a second screw shaft extending through the block and threaded into the depending end of the support, rotation of the said second screw shaft turning the support and headlight in a vertical plane, an eye bolt threaded through the depending end of the said support, and a rod pivotally connected to the eye bolt and means connecting the rod with the automobile steering arm and providing a means for turning the headlight in a horizontal plane.

2. In a dirigible headlight for automobiles having a steering arm for turning the forward wheels thereof, a pair of brackets to be secured on opposite sides of the chassis of the automobile, a bushing secured in each bracket, a bolt rotatably mounted in each bushing, a support pivotally mounted on the upper end of each bolt to swing in a vertical plane, a headlight adjustably secured in each support, each support having a depending end, a screw shaft secured to the lower end thereof and extending at a right angle to the axis of each bolt, a block threaded on each screw shaft, a second screw shaft extending through each block and threaded through the depending end of each support, an eye bolt threaded through the depending end of each support, a rod pivotally connecting the eye bolts and means connecting the said rod with the steering arm of the automobile.

3. In a dirigible headlight for automobiles having a steering arm for turning the forward wheels thereof, a bracket adapted to be secured to the chassis of the automobile, a bushing secured in the bracket, a bolt rotatably mounted in the bushing, a support pivotally mounted on the upper end of the bolt, a headlight secured to the upper end of the support and adapted to swing in a vertical plane on the said pivot, the said support having a depending end, an eye bolt threaded through the said depending end, a rod secured to the steering arm of the automobile and having an end pivotally connected to the end of the eye bolt providing a means for turning the headlight in a horizontal plane and adjustable means for moving the headlight on the said pivot.

4. In a dirigible headlight for automobiles having a steering arm for turning the forward wheels thereof, a pair of brackets adapted to be secured on opposite sides of the chassis of the automobile, a bolt rotatably mounted in each bracket, a support pivoted to the upper end of each bolt, a headlight secured to the upper end of each support, each support having a depending end at one side of the pivot, an eye bolt threaded through the depending end of each support, a rod pivotally connecting the ends of the eye bolts, means connecting the said rod to the steering arm of the automobile and means for adjusting the support on its pivot.

In testimony whereof, I sign this specification.

ROY B. VAN SICKLEN.